(12) United States Patent
Bendlak et al.

(10) Patent No.: US 11,649,910 B2
(45) Date of Patent: May 16, 2023

(54) SYSTEMS AND METHODS FOR A CLAMP (71) Applicant: ERICO International Corporation, Solon, OH (US)

(72) Inventors: Thomas Bendlak, Macedonia, OH (US); Erika Lynn Buehman, Cleveland, OH (US); Gregory Holder, Chagrin Falls, OH (US); Caitlyn VonFeldt, Kennesaw, GA (US)

(73) Assignee: ERICO International Corporation, Solon, OH (US)

( * ) Notice: Subject to any disclaimer, the term of this patent is extended or adjusted under 35 U.S.C. 154(b) by 107 days.

(21) Appl. No.: 17/190,168

(22) Filed: Mar. 2, 2021

(65) Prior Publication Data

US 2021/0278014 A1 Sep. 9, 2021

Related U.S. Application Data (60) Provisional application No. 62/986,117, filed on Mar. 6, 2020.

(51) Int. Cl.
*F16L 3/10* (2006.01)
*F16L 33/04* (2006.01)
*H02G 7/05* (2006.01)

(52) U.S. Cl.
CPC ............. *F16L 3/1033* (2013.01); *F16L 3/105* (2013.01); *F16L 33/04* (2013.01); *H02G 7/053* (2013.01)

(58) Field of Classification Search
CPC ......... F16L 3/1033; F16L 3/105; F16L 33/04; H02G 7/053

USPC .............. 24/135 R; 248/316.4, 218.4, 219.4, 248/229.17, 228.8, 230.8, 227.3, 230.9
See application file for complete search history.

(56) References Cited

U.S. PATENT DOCUMENTS

| 921,145 A | 5/1909 | Nagel |
| 1,053,684 A | 2/1913 | Vogel |
| 1,096,971 A * | 5/1914 | Van Doren ........... F16L 55/172 24/278 |
| 1,863,539 A * | 6/1932 | Hawley .................... H02G 7/20 248/226.12 |

(Continued)

FOREIGN PATENT DOCUMENTS

| CN | 202333678 U | 7/2012 |
| CN | 205533582 U | 8/2016 |

(Continued)

*Primary Examiner* — Nkeisha Smith
(74) *Attorney, Agent, or Firm* — Quades & Brady LLP (57) ABSTRACT

A clamp for supporting an electrical conductor on a structure and providing electrical continuity between the electrical conductor and the structure is provided. The clamp can include a mounting member with a through-hole and a strap, that can be configured to extend around the structure, coupled on one end to a first side of the mounting member and having a free end removably coupled to a second side of the mounting member. The clamp can include a clamping member with a through-hole and a main bolt extending through the through-holes of the mounting member and the clamping member. The main bolt can have a footer configured to contact the structure, which can be movable between a first configuration in which the footer is nested within a pocket of the mounting member and a second configuration in which at least a portion of the footer is positioned outside of the pocket.

20 Claims, 10 Drawing Sheets

(56) References Cited

U.S. PATENT DOCUMENTS

| | | | | |
|---|---|---|---|---|
| 2,226,251 | A | * | 12/1940 | Mayer ............... B60N 3/12 248/230.8 |
| 2,240,195 | A | * | 4/1941 | Reiber ............... F16B 2/06 222/113 |
| 2,524,436 | A | * | 10/1950 | Evans ............... G01N 23/18 248/230.8 |
| 2,528,173 | A | * | 10/1950 | Pinckney ............... B60N 3/12 248/229.17 |
| 2,975,998 | A | * | 3/1961 | Clift ............... F16L 3/243 248/68.1 |
| 3,241,800 | A | * | 3/1966 | Richter, III ............... F16L 3/137 248/230.9 |
| 3,988,052 | A | | 10/1976 | Mooney et al. |
| 4,023,761 | A | * | 5/1977 | Molis ............... F16B 2/065 248/316.4 |
| 4,309,263 | A | * | 1/1982 | Boyd ............... E02B 17/027 204/196.17 |
| 4,315,348 | A | * | 2/1982 | Oetiker ............... F16L 33/035 24/279 |
| 4,569,497 | A | * | 2/1986 | Elmer ............... G01F 15/18 248/180.1 |
| 4,860,985 | A | * | 8/1989 | Olson ............... G09F 7/18 248/214 |
| 4,875,864 | A | | 10/1989 | Campbell |
| 4,917,338 | A | * | 4/1990 | Olson ............... G09F 7/18 248/214 |
| 4,944,683 | A | | 7/1990 | Leonardo |
| 5,115,541 | A | * | 5/1992 | Stichel ............... F16L 33/02 24/271 |
| 5,598,995 | A | * | 2/1997 | Meuth ............... E21B 17/1035 248/219.4 |
| 5,632,461 | A | * | 5/1997 | von Helms ............... F16M 13/022 248/230.8 |
| 5,888,104 | A | | 3/1999 | Mello et al. |
| 6,290,195 | B1 | * | 9/2001 | Deuer ............... H01Q 1/1228 248/230.8 |
| 6,398,596 | B1 | | 6/2002 | Malin |
| 6,725,972 | B1 | * | 4/2004 | Kher ............... A01M 31/02 182/187 |
| 6,933,442 | B2 | | 8/2005 | Franks, Jr. |
| 8,608,517 | B2 | | 12/2013 | La Salvia et al. |
| 8,684,774 | B1 | | 4/2014 | La Salvia et al. |
| 9,515,395 | B1 | | 12/2016 | Chadbourne |
| 10,008,785 | B2 | | 6/2018 | Trombley |
| 10,330,272 | B2 | * | 6/2019 | Chung ............... F21V 21/116 |
| 10,333,231 | B2 | | 6/2019 | Trombley |
| 2009/0152419 | A1 | * | 6/2009 | Wallace ............... A63B 71/023 248/219.4 |
| 2011/0057081 | A1 | * | 3/2011 | Shiau ............... F21V 17/12 248/219.4 |
| 2011/0271571 | A1 | * | 11/2011 | Lennard ............... G09F 7/18 248/316.1 |
| 2014/0138497 | A1 | * | 5/2014 | Chung ............... F16M 13/022 248/219.4 |
| 2014/0252188 | A1 | * | 9/2014 | Webster ............... F16M 11/14 248/229.17 |
| 2015/0083875 | A1 | * | 3/2015 | Lloyd ............... H01Q 1/1228 29/428 |
| 2019/0103683 | A1 | | 4/2019 | Osenga |
| 2019/0170273 | A1 | * | 6/2019 | May ............... F16B 2/08 |

FOREIGN PATENT DOCUMENTS

| | | |
|---|---|---|
| CN | 207178378 U | 4/2018 |
| DE | 3116518 A1 | 1/1983 |
| DE | 3332353 C2 | 4/1992 |
| DE | 3502022 C2 | 6/1992 |
| DE | 4123390 A1 | 1/1993 |
| DE | 102004021639 A1 | 12/2004 |
| DE | 19716400 B4 | 8/2012 |
| DE | 102013216561 B4 | 6/2018 |
| DE | 202016008620 U1 | 10/2018 |
| EP | 373477 B1 | 12/1993 |
| EP | 1986273 B1 | 10/2011 |
| EP | 2555331 B1 | 9/2016 |
| FR | 2558882 A1 | 11/1988 |
| GB | 220800 A | 8/1924 |
| GB | 226120 A | 12/1924 |
| GB | 1110574 A | 4/1968 |
| GB | 2245772 B | 11/1994 |
| GB | 2402681 A | 12/2004 |
| KR | 200418850 Y1 | 6/2006 |

* cited by examiner

SYSTEMS AND METHODS FOR A CLAMP

CROSS-REFERENCE TO RELATED APPLICATIONS

This application claims priority under 35 U.S.C. 119 from U.S. Provisional Application No. 62/986,117, filed Mar. 6, 2020, and is incorporated herein by reference in its entirety.

BACKGROUND

In many applications it may be useful to ground or bond metallic members using a clamp to secure electrical conductors to the metallic members. Conventionally, u-bolt style clamps are used to ground or bond metallic members with a circular profile such as fence posts, poles, and pipes.

SUMMARY

Some embodiments of the invention provide a clamp for supporting an electrical conductor on a structure and providing electrical continuity between the electrical conductor and the structure. The clamp can include a mounting member including a pocket, a threaded through-hole, and a contact surface. A strap can be coupled on one end to a first side of the mounting member and can have a free end removably coupled to a second side of the mounting member. The strap can be configured to extend around the structure. The clamp can further include a clamping member with an oblong through-hole, a curved surface, and a first conductor area. A main bolt with a footer can extend through the through-holes of the mounting member and the clamping member. The main bolt can have a footer configured to contact the structure. The footer can be movable between a first configuration in which the footer is nested within the pocket and a second configuration in which at least a portion of the footer is positioned outside of the pocket. A nut can be threadably engaged with the main bolt. The main bolt can be configured to tighten the strap by moving the footer from the first configuration to the second configuration in which the footer contacts with the structure. The clamp can be configured to retain the electrical conductor between the contact surface and the first conductor area with the nut contacting the curved surface of the clamping member to clamp the electrical conductor between the clamping member and the mounting member.

Other embodiments of the invention provide a clamp capable of engaging a structure in an initial securement position and a final securement position. The clamp can include a mounting member with a first side and a second side and including an internally threaded through-hole. A strap can be coupled on one end to the first side of the mounting member and can have a free end removably coupled to the second side of the mounting member. The strap can be configured to extend around the structure. The clamp can further include a main bolt that can extendd through and threadably engage with the through-hole of the mounting member. The main bolt can have a footer configured to contact the structure. In the initial securement position, at least the strap and the mounting member can be configured to be in contact with the structure. In the final securement position, at least the strap and the footer, but not the mounting member, can be configured to be in contact with the structure.

Yet other embodiments of the invention provide a method of securing a clamp in electrical continuity with a structure. The method can include extending a strap around the structure, with a first end of the strap secured to a first side of a mounting member; securing a second end of the strap to a second side of the mounting member, with a first surface of the mounting member facing the structure; tightening a bolt that extends through the mounting member and includes a footer, so that that the footer is urged into engagement with the structure and the bolt thereby urges the mounting member away from the structure and tensions the strap; and tightening a nut on the bolt to clamp an electrical conductor to the mounting member, between a clamping member and the mounting member, to provide electrical continuity between the electrical conductor and the structure via the mounting member and one or more of the strap or the bolt.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise defined or limited, directional terms are used for convenience of reference for discussion of particular figures or examples. For example, references to downward (or other) directions may be used to discuss aspects of a particular example or figure, but do not necessarily require similar orientation or geometry in all installations or configurations.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes clamps that can be used to create an electrical connection between an electrical conductor and a metallic pole. The context and particulars of this discussion are presented as examples only. For example, embodiments of the disclosed invention can be configured in various ways, including with other shapes and arrangements of elements. Similarly, embodiments of the invention can be used with arrangements of poles or other metallic structures other than those expressly illustrated or described herein. In this regard, for example, some embodiments not expressly discussed below can include some or all of the components of any number of the embodiments expressly described and illustrated below, in any variety of combinations. Further, some embodiments can be employed to support objects other than electrical conductors.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

In conventional arrangements, electrical conductors can be secured to structures with a U-bolt clamp, including structures such as poles with circular profiles, to provide an electrical path between the conductors and the structures. A U-bolt clamp has a U-bolt sized to fit around a pole having a certain dimension and is secured thereto with a clamp member and nuts received on the threaded legs of the U-bolt, whereby the pole is clamped between the clamp member and the U-bolt. Typically, the clamp member of the U-bolt clamp has a mount portion within which an electrical conductor can be secured. For example, the mount portion can be secured between a nut and the clamp member on one of the legs of the U-bolt. Although these conventional arrangements can provide useful support and an electrical path between a pole and an electrical conductor, installation can require the clamp to be held in place against the pole while securing the electrical conductor to the clamp. In some arrangements, the electrical continuity between the clamp and the pole is substantially reliant on the contact between the clamp member and the pole, which by the very nature of a U-bolt clamp, is less than a majority of the circumference of the pole and requires the correct sizing of the U-bolt clamp to the pole diameter. Further, and relatedly, particular U-bolt clamps may be useful only for a specific, limited range of pole sizes, thereby requiring users to precisely predetermine needed sizes for particular installations or to stock a large number of sizes of clamps.

Embodiments of the invention can address these or other issues. For example, in some embodiments, an electrical conductor can be secured to an object, including a pole with a circular profile or other elongate object, in various ways. Although embodiments of the invention can be suitably used, in particular, with a pole having a circular profile, some embodiments can also be used with poles and structural members having other profiles, including rectangular and I-beam shaped members.

In some cases, a clamp can include a strap that can be attached to one end of a mounting member The strap can be configured to extend around the pole and attach to another end of the mounting member to secure the pole between the strap and the mount. The strap can be flexible to provide a substantially continuous contact with the object, over at least part of the length of the strap, and can be made from an electrical conductive material to provide an electrical path between the mounting member, the strap, and the pole. In some embodiments, the strap can be adjustable to allow the clamp to accommodate poles of different dimensions.

In some embodiments, a clamp can be secured to the pole by a bolt that threadably engages a mounting member and extends through the mounting member to engage (e.g., contact) the pole. Tightening of the bolt can increase the tension within an associated strap as the bolt's engagement with the pole forces the mounting member away from the pole, which can further secure the clamp to the pole.

In some embodiments, electrical conductors can be electrically coupled to the clamp independent of the securement of the mounting member to the pole. For example, a clamping member can be provided that receives the bolt therethrough and can be tightened to secure the electrical conductors between the clamping member and the mounting member with a nut threadably engaged with the bolt. This may lead to improved installation procedures in some cases. For example, in some embodiments, a clamp can be staged on a pole or other structure with a strap, and a bolt can then be tightened—before necessarily introducing conductors—to tension the strap and thereby firmly secure the clamp to the pole or other structure. With the clamp thus firmly secured to the relevant structure, an installer can then focus on aligning and securing conductors to the clamp, without needing to also hold the clamp to the structure.

Some embodiments can also (or alternatively) provide other benefits. For example, clamping members of some clamps can be configured to swivel relative to a main bolt in order to readily accommodate different numbers or sizes of conductors, including as may allow multiple conductors of different sizes to be securely attached to a particular clamp. As another example, some clamping members can include gaps (e.g., as associated with a pronged geometry) that can allow users to more readily secure and verify proper installation of conductors than may be possible with conventional designs.

Figure 1:
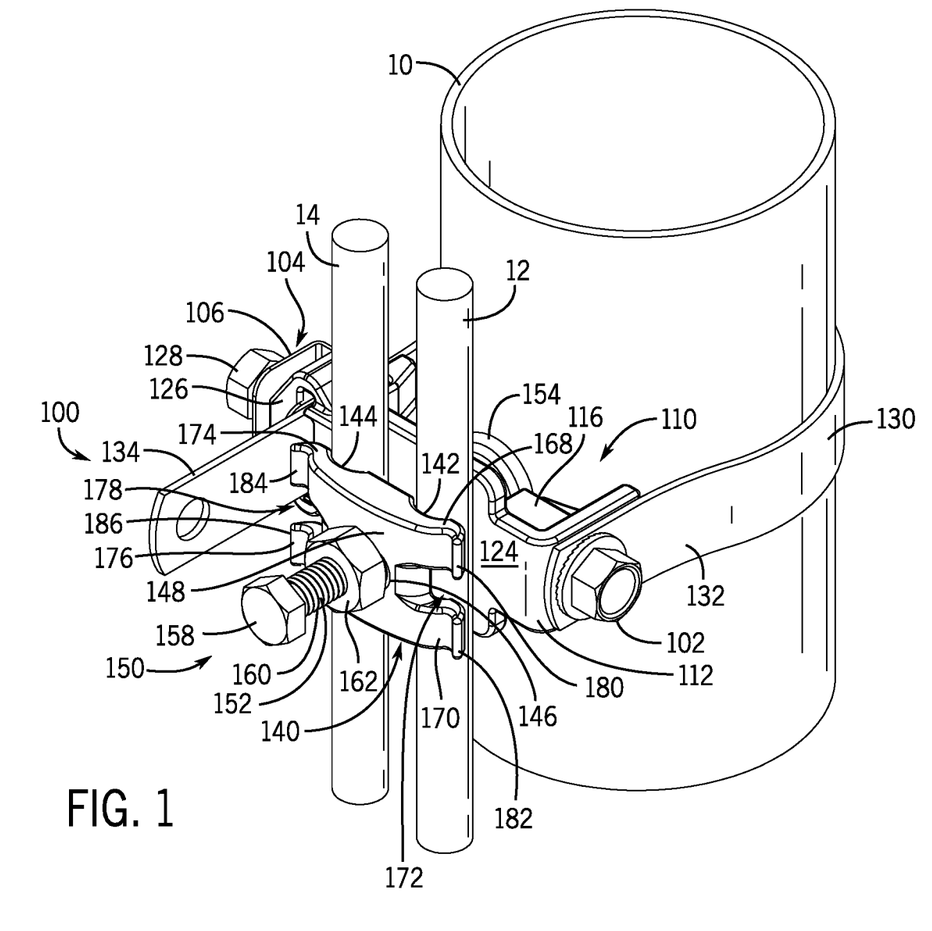
FIGS. 1 and 2 are top front isometric views of a clamp in an installation configuration, according to an embodiment of the invention.
Figure 2:
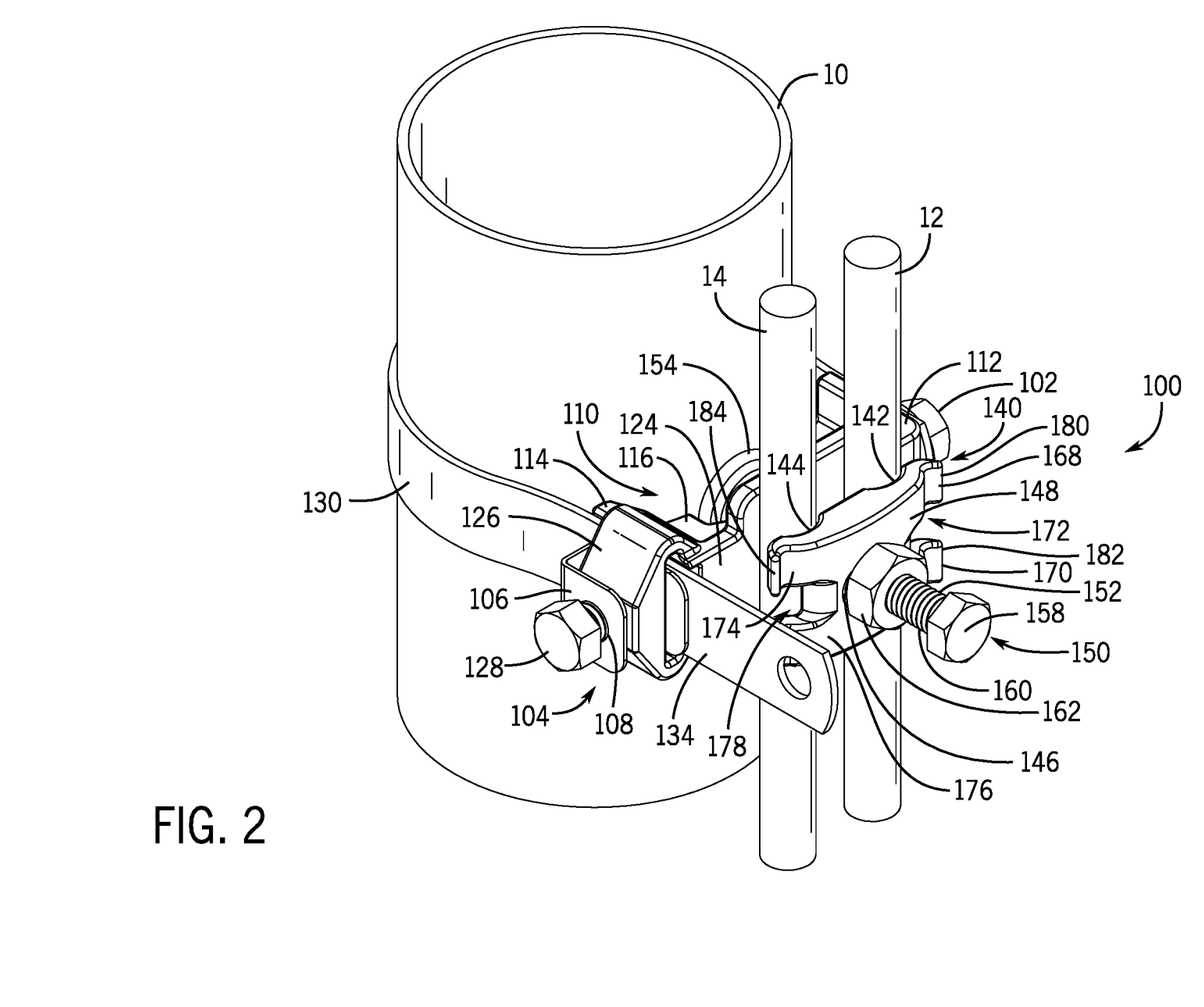

FIGS. 1 through 6 illustrate an example clamp 100 according to an embodiment of the present invention, including with the clamp 100 in an installation configuration secured to a pole 10 (see FIGS. 1 and 2). In particular, the clamp 100 includes a mounting member 110, a strap 130, a clamping member 140, and a main bolt 150, which can interoperate to secure the clamp 100 to the pole 10 (or another structure) and secure one or more conductors to the clamp 100.

In particular, the mounting member 110 has a first side 112, a second side 114 opposite the first side 112, and a body 116 extending between the first side 112 and the second side 114. The first side 112 is configured to secure one end of the strap 130 and the second side 114 has a strap retention device 104 comprising a guide 126 and a bolt 128 configured to receive and secure the other end of the strap 130. (As used herein, the "end" of a strap may indicate the absolute end of a strap, or may indicate an end portion of the strap that extends from the absolute end to the structure to be engaged by the strap.)

Figure 3:
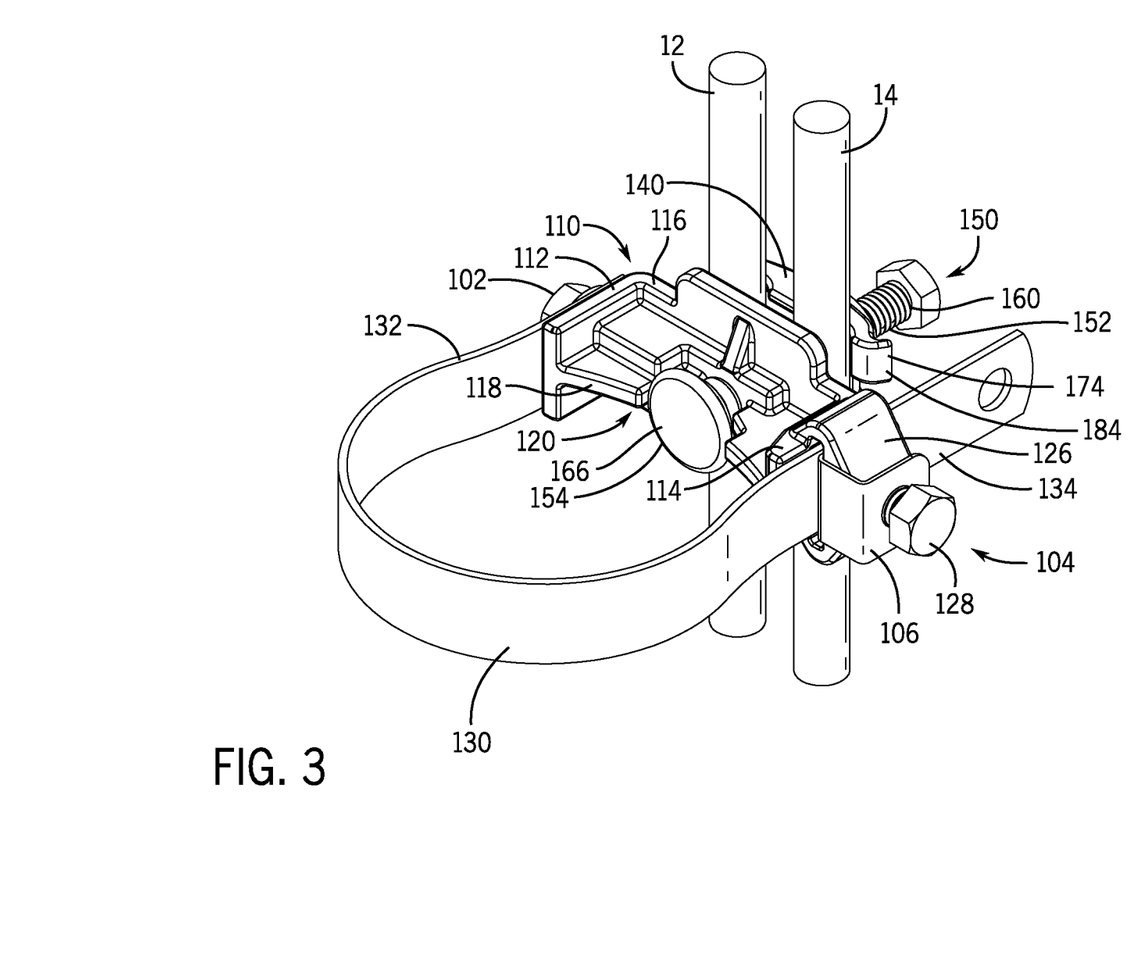
FIG. 3 is a top rear isometric view of the clamp of FIG. 1.
Figure 4:
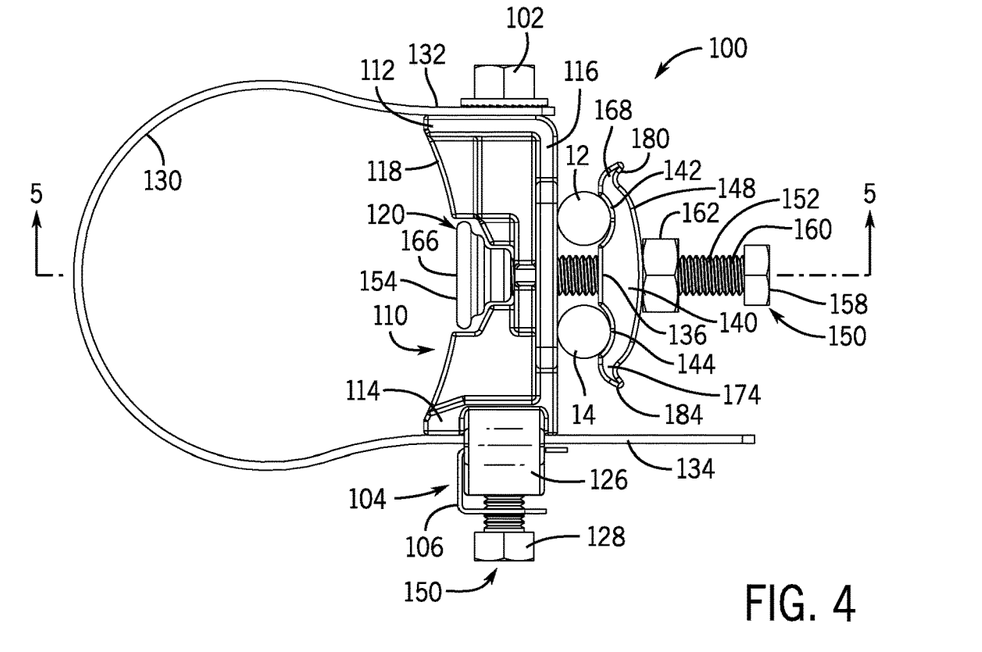
FIG. 4 is a top plan view of the clamp of FIG. 1.
Figure 5:
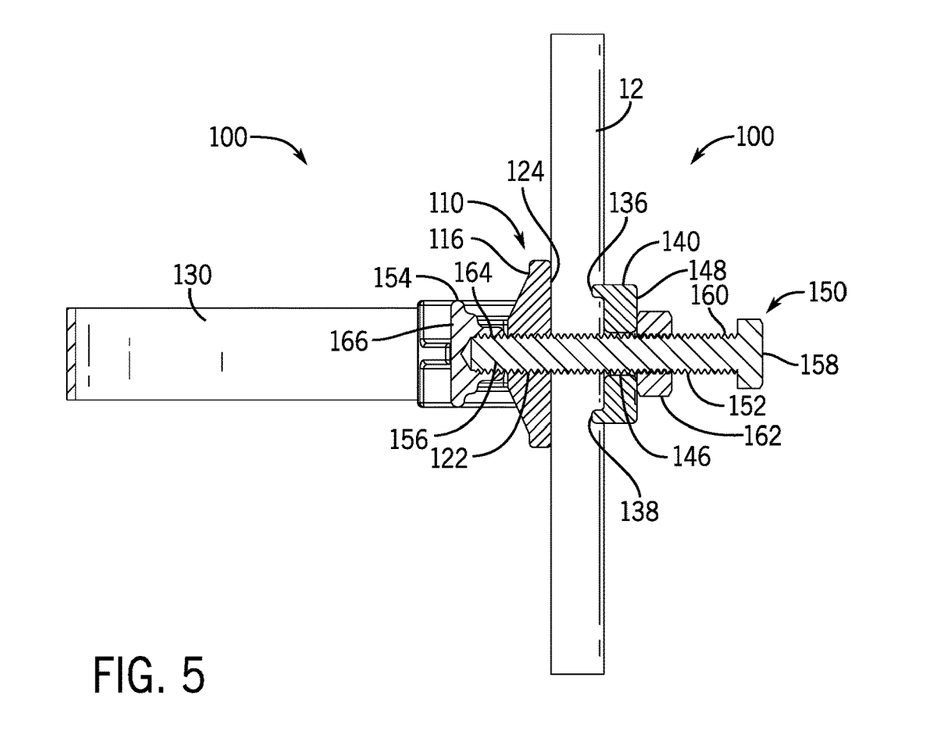
FIG. 5 is a cross-sectional view of the clamp of FIG. 1 taken along line 5-5 in FIG. 4.

In some embodiments, a retention device can include multiple components that can be adjusted to secure or release a strap. For example, in the embodiment illustrated, the retention device 104 includes a retainer clip 106 as shown. The retainer clip 106 can be configured to be receivable within the guide and sized similarly to the portion of the strap received within the guide 126. Further, the bolt 128 can extend through part of the retainer clip 106 and part of the guide 126 so that the retainer clip 106 can be urged against a received strap 130 by the bolt 128 within the guide 126. Thus, the retainer clip 106 is configured to distribute the force of the bolt 128 across more of the strap 130 than if the bolt 128 was used alone. As shown in FIG. 3, the retainer clip 106 can have a retainer clip hole 108 that is configured to receive the bolt 128 therethrough. The relationship between the bolt 128 and the retainer clip hole 108 allows the retainer clip 106 to maintain a position relative to the guide 126 while allowing the bolt 128 to move relative to the retainer clip 106 and the guide 126, while also helping to retain the retainer clip 106 relative to the guide 126 and the bolt 128.

Figure 8:
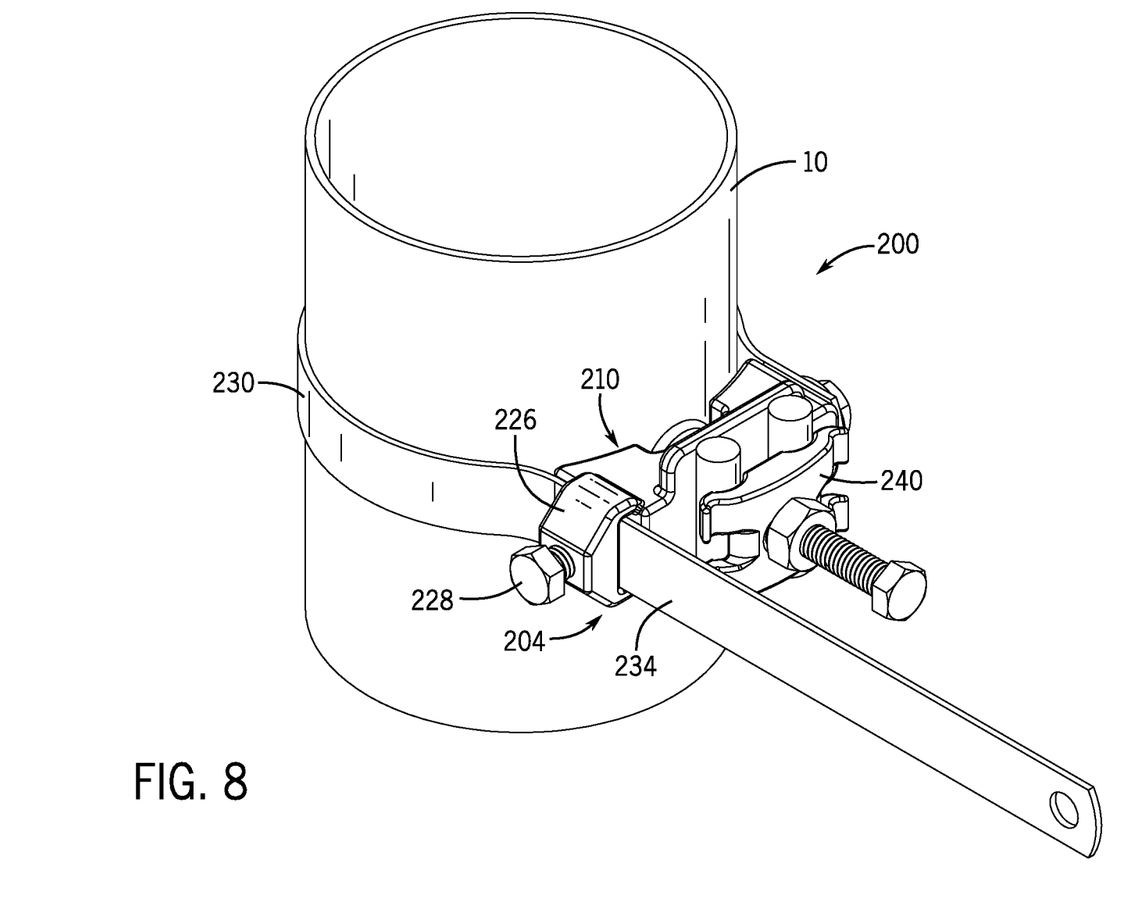
FIG. 8 is a top front isometric view of a clamp according to another embodiment of the invention.

Alternatively, if it is desired to provide a more focused force on a strap, an embodiment of a clamp 200 (see FIG. 8) can be provided. In many aspects, the clamp 200 is similar to the clamp 100 and similar numbering in the 200 series is used for the clamp 200. For example, the clamp 200 has a clamping member 240 and a mounting member 210 with a retention device 204. The retention device 204 includes a guide 226 and a bolt 228, similarly to the retention device 104, but does not include a retainer clip. Therefore, when tightening the bolt 228, the entire tightening force is delivered to the free end 234 of the strap 230, as received within the guide 226, over an area that is roughly the size of the area of the end of the bolt 228.

Continuing with the description of the clamp 100, and as shown in FIG. 3 in particular, the body 116 has a first surface 118 that is configured to face the pole 10 and has a pocket 120 extending inward from the first surface 118. The first surface 118 can shaped to be complementary to that of a contact surface of the structure. For example, the first surface 118 can be curved to be complementary to the curved surface of the pole 10.

As used herein, "complementary" refers to profiles that exhibit contours with corresponding curvature and does not necessarily require that the relevant profiles are geometrically complementary in a strict mathematical sense. For example, a first surface that is concave can be considered to be "complementary," as used herein, to a second surface that is convex, with the protruding direction of the convex profile extending toward the recessed direction of the concave profile. Correspondingly, as another example, a concave curved profile that extends along a free end of a leg of a mounting member and that is configured to seat against a convex outer surface of curved structure (e.g., a circular pole) can be considered to be "complementary," as used herein, to the outer surface of the curved structure.

Figure 7:
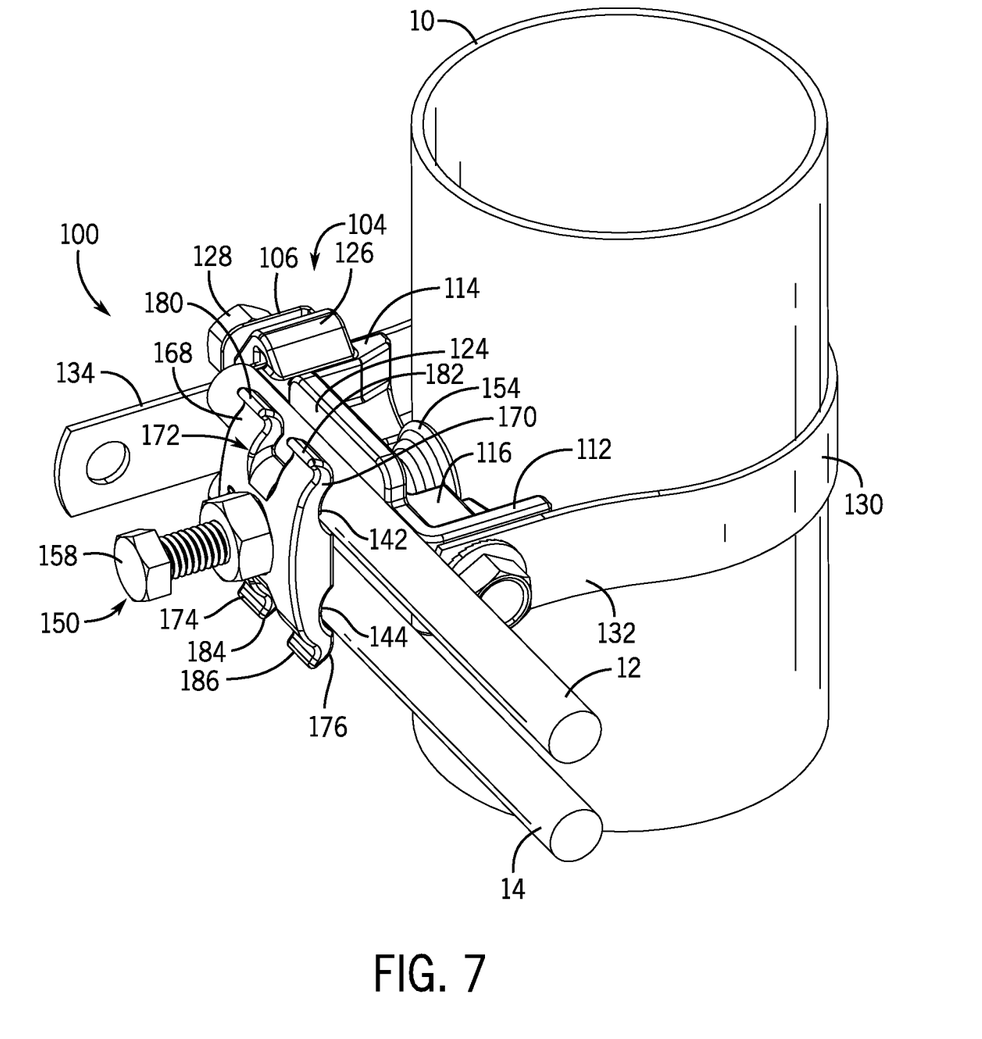
FIG. 7 is a top front isometric view of the clamp of FIG. 1, with a clamping member rotated 90 degrees.

As shown in FIG. 2, for example, the mounting member 110 also has a contact surface 124 opposite the pocket 120 in the body 116. The contact surface 124 is configured to provide a surface for conductors 12, 14 to make contact when clamped between the mounting member 110 and the clamping member 140. In this regard, for example, the contact surface 124 extends between the sides 112, 114, extends substantially beyond the surface 118 in the direction in which a pole (or other object) is to be received within the strap 130, and configured to be radially spaced from and in line with the pole 10 (from a frame of reference of the pole 10 or the closed loop of the strap 130. The shape and size of the contact surface 124 is configured to allow rotation of the clamping member 140 relative to the contact surface 124 for clamping conductors at an orientation other than as shown in FIGS. 1 and 2. For example, FIG. 7 illustrates the orientation of the clamping member 140 of the clamp 100 rotated to permit the conductors 12, 14 to be clamped perpendicular to the length of the pole 10. It should be understood that the configuration of the clamp 100, including the contact surface 124 and the clamping member 140, allows the clamping of conductors in many orientations with respect to the length of a pole in addition to those shown and described herein.

Figure 6:
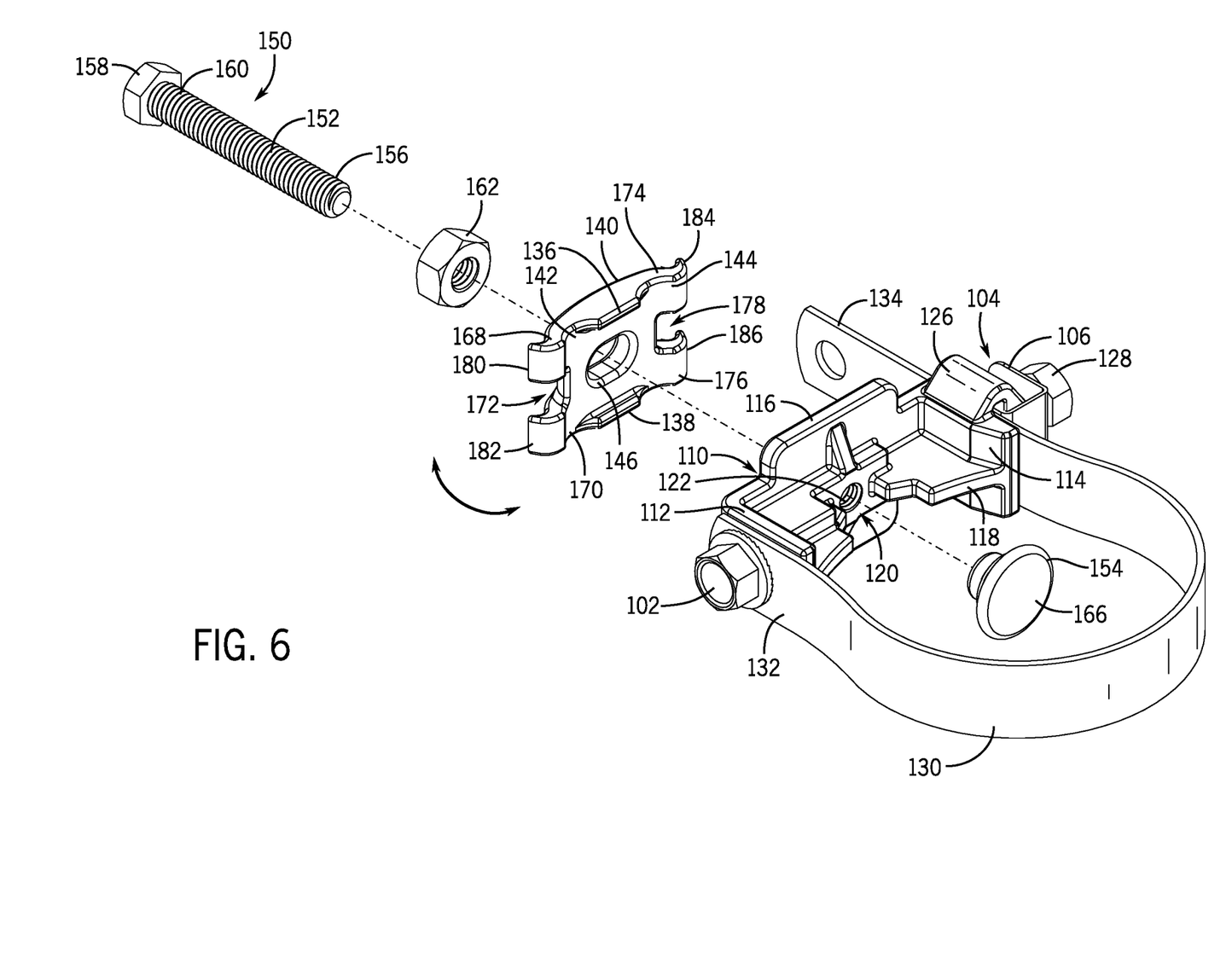
FIG. 6 is a partially exploded view of the clamp of FIG. 1.

The mounting member 110 also has a threaded through-hole 122 extending through the contact surface 124 and into the pocket 120 of the body 116 (see FIG. 6). As also discussed in detail below, the threaded through-hole 122 can threadably receive the main bolt 150 to secure the mounting member 110 to the pole 10.

The strap 130 can generally be formed from a flexible material capable of conforming to a desired degree to the peripheral surface of the pole 10. In some embodiments the strap 130 can comprise electrically conductive material such as copper or tin or a combination thereof and can thereby be configured to provide an electrically conductive path between the pole 10 and the mounting member 110. In this regard, for example, the extensive contact between the strap 130 and the pole 10 can provide an improved electrical bonding for many installations as compared to conventional arrangements.

In the illustrated embodiment, one end 132 of the strap 130 is secured to the first side 112 of the mounting member 110 with a bolt 102; however, other securing methods are contemplated such as, for example, welding, clamping, or other known attachment mechanisms to secure traps to solid bodies. A free end 134 of the strap 130, opposite the end 132, can be received through the guide 126 on the second side 114 of the mounting member 110. As also noted above, the free end 134, as described herein, can be understood to mean any portion of the strap 130 opposite the one end 132 and beyond portion of the strap 130 in contact with the pole 10. During installation, a user can pull the free end 134 through the guide 126 and the bolt 128 can then be tightened to secure the strap 130 within the guide 126 and to the mounting member 110. In this regard, and as also alluded to above, the flexible nature of the strap 130 and the relatively simple mechanism for securing the strap 130 to the mounting member 110 can allow a user to stage the mounting member 110 to the pole 10 (or other object) relatively easily, then release the mounting member 110 to undertake further installation operations (e.g., rather than needing to manually hold the mounting member 110 in place throughout the installation process).

Generally, mounting members according to embodiments of the invention can include threaded features that engage main bolts in order to align and adjustably support the main bolts relative to a structure to which the mounting members are to be attached. Thus, in some cases, a mounting member can be firmly secured to a relevant structure via a simple tightening of a single threaded connection.

In this regard, some embodiments may include main bolts that are configured to be readily rotated even when bearing against a relevant structure to tighten a strap and thereby secure a mounting member. For example, according to the embodiment shown in FIGS. 1 through 6, the main bolt 150 includes a threaded rod 152 with a footer 154 coupled to a first end 156 and a bolt head 158 on a second end 160 opposite the first end 156. For example, the footer 154 can be directly coupled to the threaded rod 152 as shown, whereby rotation of the threaded rod 152 directly translates to rotation of the footer 154. In other embodiments, however, other configurations are possible, including configurations in which a footer is freely rotatable relative to a threaded rod of a main bolt.

In different embodiments, a variety of different configurations are possible for a footer. For example, the footer 154 has a threaded recess 164 configured to receive the first end 156 of the threaded rod 152. The footer 154 has a conical shape, which can nest completely within the pocket 120 (see, e.g., FIG. 4) and includes a contact surface 166 that is configured to directly engage the pole 10 (or other structure). The contact surface 166 can be a flat, circular surface; however, other configurations are contemplated. For example, a contact surface can be contoured to match the peripheral surface of the pole or another object to which a clamp is to be secured. In some embodiments, the footer 154 can be coupled to the threaded rod 152 with a swivel joint.

As generally noted above, a clamping member can be used to secure one or more electrical conductors to a mounting body, so that the electrical conductors can be electrically bonded to a structure (e.g., a pole) via the mounting body. As also noted above, it may be useful in this regard for a clamping member to secure electrical conductors to a mounting body separately (e.g., independently) from the mounting body being secured to the relevant structure (e.g., the pole 10). Looking at FIGS. 1 and 2, for example, the clamping member 140 is configured to retain at least one electrical conductor between the clamping member 140 and the mounting member 110. In this regard, the clamping member 140 has a set of conductor areas, for example a first conductor area 142 and a second conductor area 144. The first and second conductor areas 142, 144 are sized and shaped to receive at least a portion of a set of electrical conductors 12, 14, as can provide more contact area with which to clamp the electrical conductors 12, 14, with corresponding improvement in retention strength and electrical connection. For example, the first and second conductor areas 142, 144 are concavely curved to receive the curved periphery of the electrical conductors 12, 14.

Turning to FIG. 6, the first and second conductor areas 142, 144 are also partially defined by a first protrusion 136 and a second protrusion 138 extending from a side of the clamping member 140 opposite the curved surface 148 and located on opposing sides of the through-hole 146 from each other. In particular, the spacing of the first and second protrusions 136, 138 from each other can help to reduce the material required to form the clamping member 140 and can contribute to improved retention of conductors. For example, the relatively thin edges of the protrusions 136, 138 may tend to impress into malleable conductors as the clamping member 140 is tightened into a clamped configuration (e.g., as further discussed below), which can generally increase the retention force applied by the clamping member 140 on the conductors.

In some embodiments, a conductor area can be further defined by other structures that also improve the overall functionality of a clamp. For example, the first conductor area 142 is further partially defined by a first set of arms, including a first arm 168 and a second arm 170. The first and second arms 168, 170 define a first gap 172 therebetween. Similarly, the second conductor area 144 is further partially defined by a second set of arms, including a third arm 174 and a fourth arm 176, wherein the third and fourth arms 174, 176 define a second gap 178 therebetween. The first and second gaps 172, 178 can allow a user to easily visually verify proper installation of a conductor and can also readily allow a stranded (or other malleable) conductor (not shown) to deform when being clamped between the clamping member 140 and the mounting member 110, thus providing a more secure clamping of the stranded conductor within the clamp 100.

Further, the distal ends 180, 182, 184, 186 of the first, second, third, and fourth arms 168, 170, 174, 176, respectively, are flared in a direction opposite a clamping direction (as further discussed below). The flared distal ends 180, 182, 184, 186 can provide a grip point for a user to hold onto and manipulate the clamping member 140. The flared distal ends 180, 182, 184, 186 can also facilitate the reception of the conductors 12, 14 into the first and second conductor areas 142, 144 when a user inserts the conductors 12, 14 from the respective sides of the clamp 100, including by converting a lateral insertion force from a conductor into a lifting force (opposite the clamping direction) to swivel the clamping member 140 into a more beneficial orientation to receive and secure the conductor.

In some embodiments, features on a clamping member or other component can help to allow adjustments of a clamping assembly to accommodate different sizes of conductors, including during installation of two conductors of different sizes to be simultaneously secured by a single clamp. In this regard, for example, the clamping member 140 also has a curved surface 148 and a through-hole 146 extending through the clamping member 140 from the curved surface 148 to an opposing side of the clamping member 140, between the set of conductor areas 142, 144 (see FIG. 6).

The through-hole 146 has an oblong shape in the illustrated embodiment, which allows the clamping member 140 to swivel (i.e., to move so that a through axis of the through-hole 146 is moved out of a parallel relationship with the mounting member 110) relative to the threaded rod 152, without removal of the threaded rod 152 from the threaded through-hole 122 or removal of the clamping member 140 from the threaded rod 152. Further, the oblong through-hole 146 also allows the clamping member 140 to be secured to clamp one or more electrical conductors in a swiveled orientation. For example, when only a single electrical conductor is secured between the clamping member 140 and the mounting member 110, or when multiple electrical conductors of different sizes are secured within the clamp 100, the clamping member can be swiveled during installation (e.g., as shown by the curved arrow in FIG. 6) so that the spacing between the clamping member 140 and the contact surface 124 of the mounting member 110 is different at the first conductor area 142 than at the second conductor area 144. Correspondingly, the curved surface 148 is configured to provide a surface of constant attitude to contact the nut 162 in a plurality of (e.g., all) swivel orientations of the clamping member 140. In other words, the curved surface 148 is generally configured to extend locally perpendicularly to the threaded rod 152, adjacent to the nut 162, with the clamping member 140 at any of a plurality of swiveled orientations relative to the threaded rod 152 to provide a contact surface for firm engagement by the nut in the clamping direction.

When the clamp 100 is assembled, the threaded rod 152 of the main bolt 150 extends through the through-hole 146 of the clamping member 140 and the threaded through-hole 122 of the mounting member 110. Further, when the clamp 100 is in an installation configuration, the footer 154 can be positioned within the pocket 120 (see, e.g., FIGS. 3 and 4). The main bolt 150 is configured to then be rotated relative to the mounting member 110 to move the main bolt 150, and thereby the footer 154, linearly with respect to the mounting member 110. In some embodiments, as also noted above, the footer 154 can be initially positioned in a first configuration in which the footer 154 is nested within the pocket 120 and can be moveable to a second configuration in which at least a portion of the footer is positioned outside of the pocket 120. Further, when the clamp 100 is assembled, the nut 162 is positioned along the threaded rod 152 between the bolt head 158 and the clamping bracket 140.

As shown in FIGS. 1 and 2, when in use, the clamp 100 is configured to be secured to the pole 10 and provide an electrical path between electrical conductors 12, 14 retained therein and the pole 10. The strap 130 can be wrapped around the pole 10 and can be pulled through the guide 126 until the first surface 118 of the body 116 of the mounting member 110 is in contact with the pole 10. The strap 130 can be secured within the guide 126 with the bolt 128 urging the retainer clip 106 against the strap 130 to place the clamp 100 in an initial securement position. The main bolt 150 can then be tightened to urge the contact surface 166 of the footer 154 into the pole 10 (e.g., including to initially make contact with the pole 10, as the footer 154 moves out of a nested configuration relative to the pocket 120). Further tightening of the main bolt 150 can then increase the tension within the strap 130 to place the clamp 100 in a final securement position.

In the final securement position, the mounting member 110 can be urged away from the pole 10 by the engagement of the footer 154 with the pole 10, including so that the first surface 118 can break contact with the pole 10. In that case, the electrical continuity between the pole 10 and the mounting member 110 may be primarily achieved through the strap 130, although, some continuity can also be provided through the footer 154 and the threaded rod 152 of the main bolt 150. Usefully, this approach can allow the clamp 100 to be readily adapted to a wide variety of structural shapes and sizes (e.g., poles of different diameters) while still providing strong structural engagement and substantial electrically bonding contact between the clamp 100 and the relevant structure.

With the mounting member 110 appropriately disposed (e.g., anchored by the strap 130 to the pole 10, as described above) one or both of the electrical conductors 12, 14 (or other conductors, including those of different sizes) can be received between the contact surface 124 of the mounting member 110 and the clamping member 140, within the conductor areas 142, 144, thus completing the electrical continuity path between the pole 10 and the electrical conductors 12, 14. The nut 162 can then be moved along the threaded rod 152 in the clamping direction to urge the clamping member 140 toward the mounting member 110 to secure the conductors 12, 14 in the respective conductor areas 142, 144.

Figure 9:
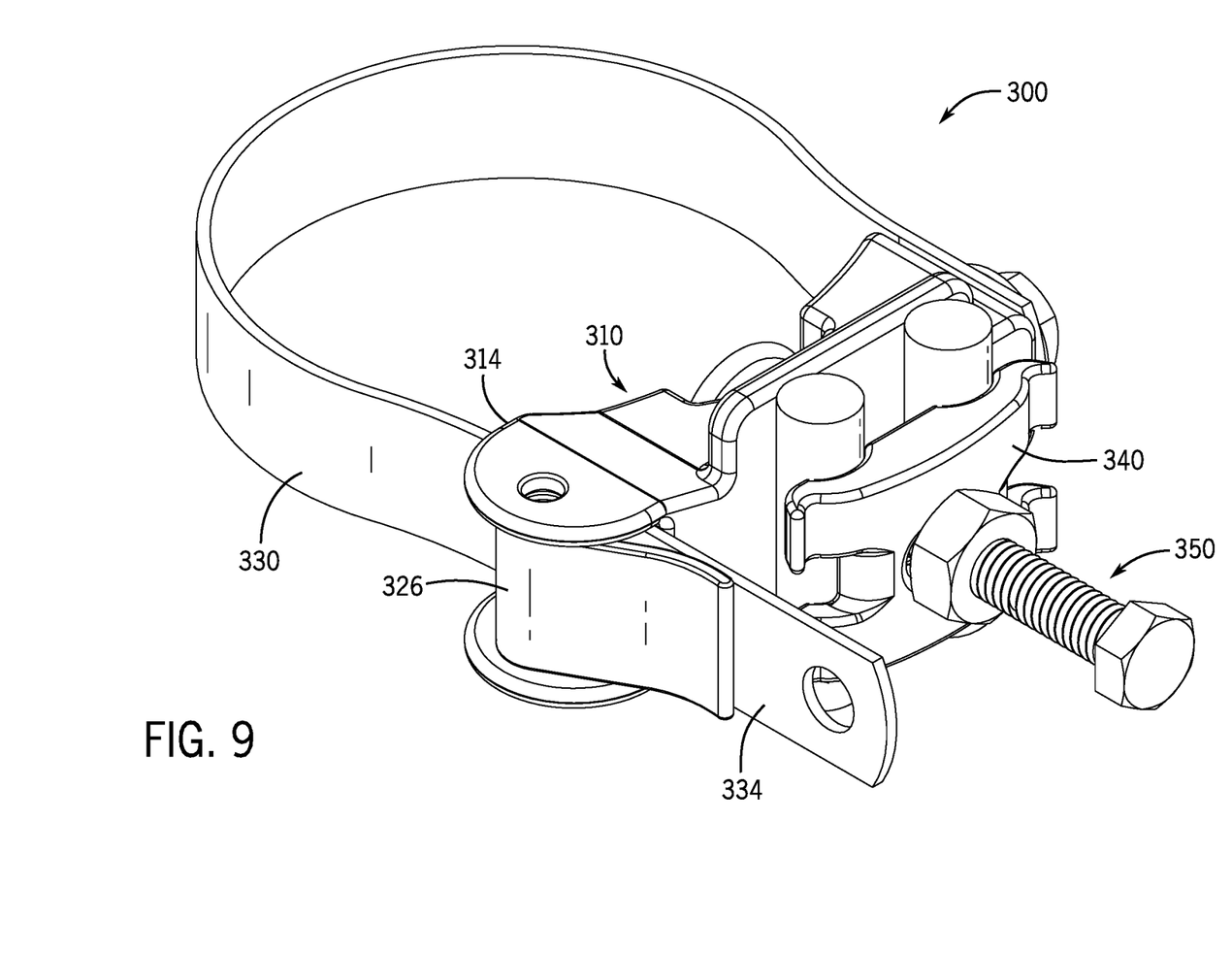
FIGS. 9 and 10 are top rear isometric views of a clamp according to another embodiment of the invention.
Figure 10:
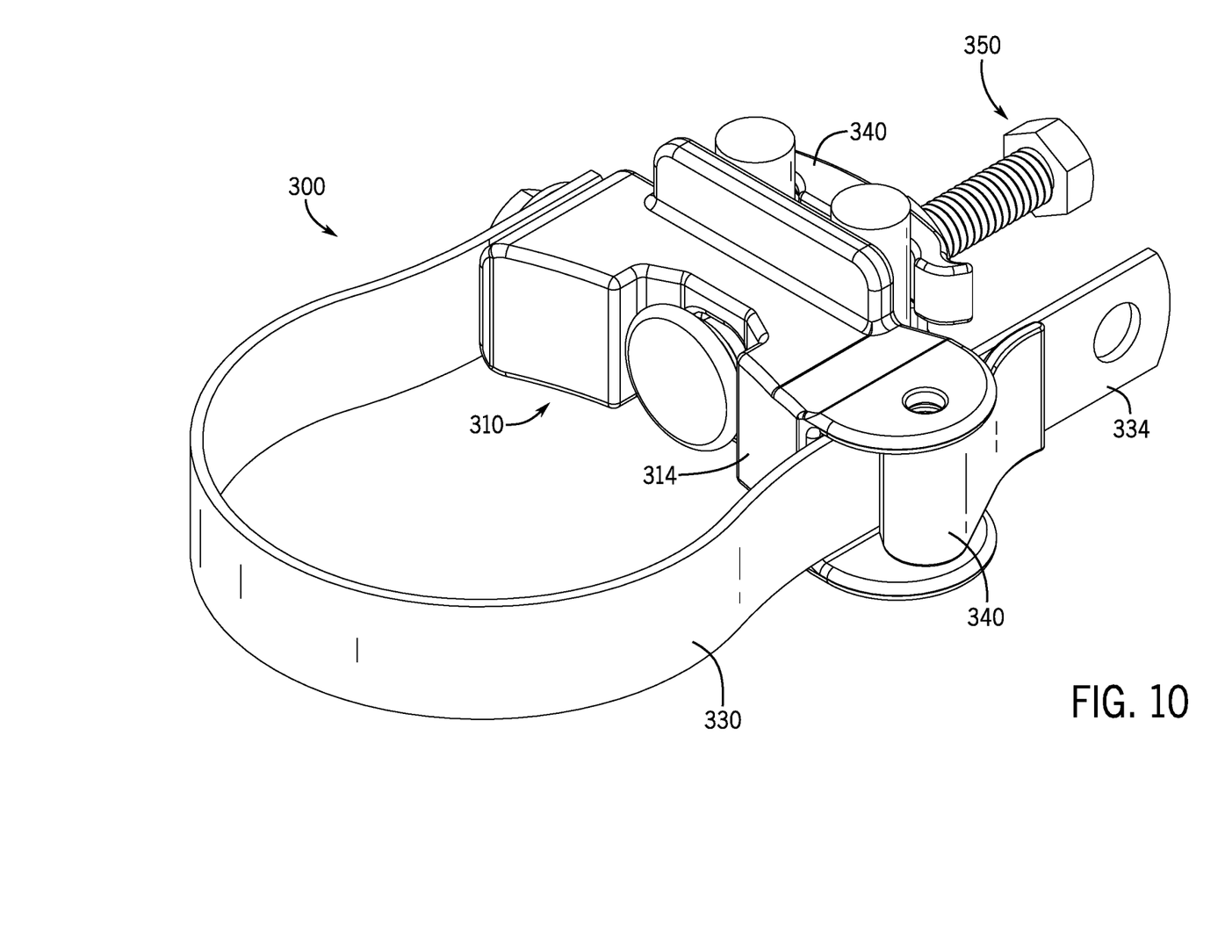

FIGS. 9 and 10 illustrate another embodiment of a clamp 300 according to the invention, as also can be secured to a pole or other structure. In many aspects, the clamp 300 is similar to the clamp 100 described above and similar numbering in the 300 series is used for the clamp 300. For example, the clamp 300 has a mounting member 310, a strap 330, a clamping member 340, and a main bolt 350. The clamp 300 is also configured to be secured to a pole 10 with the strap 330 and to separately retain electrical conductors 12, 14 between the mounting member 310 and the clamping member 340. The clamp 300 also utilizes the main bolt 350 to further tension the strap 330, and the strap 330 provides electrical continuity between the pole 10 and the mounting member 310 and therefore also between the pole 10 and the conductors 12, 14.

In some aspects, however, the clamps 100, 300 differ from each other. For example, the second side 314 of the mounting member 310 has a strap retention device comprising a cam member 326 rotatably coupled to the mounting member 310. The free end 334 of the strap 330 can be received between the cam member 326 and the mounting member 310 and the cam member 326 can retain the strap 330 with pressure and friction when engaged. Although a particular cam configuration is illustrated in FIG. 9, any variety of know cams for securing straps can be similarly employed.

Figure 11:
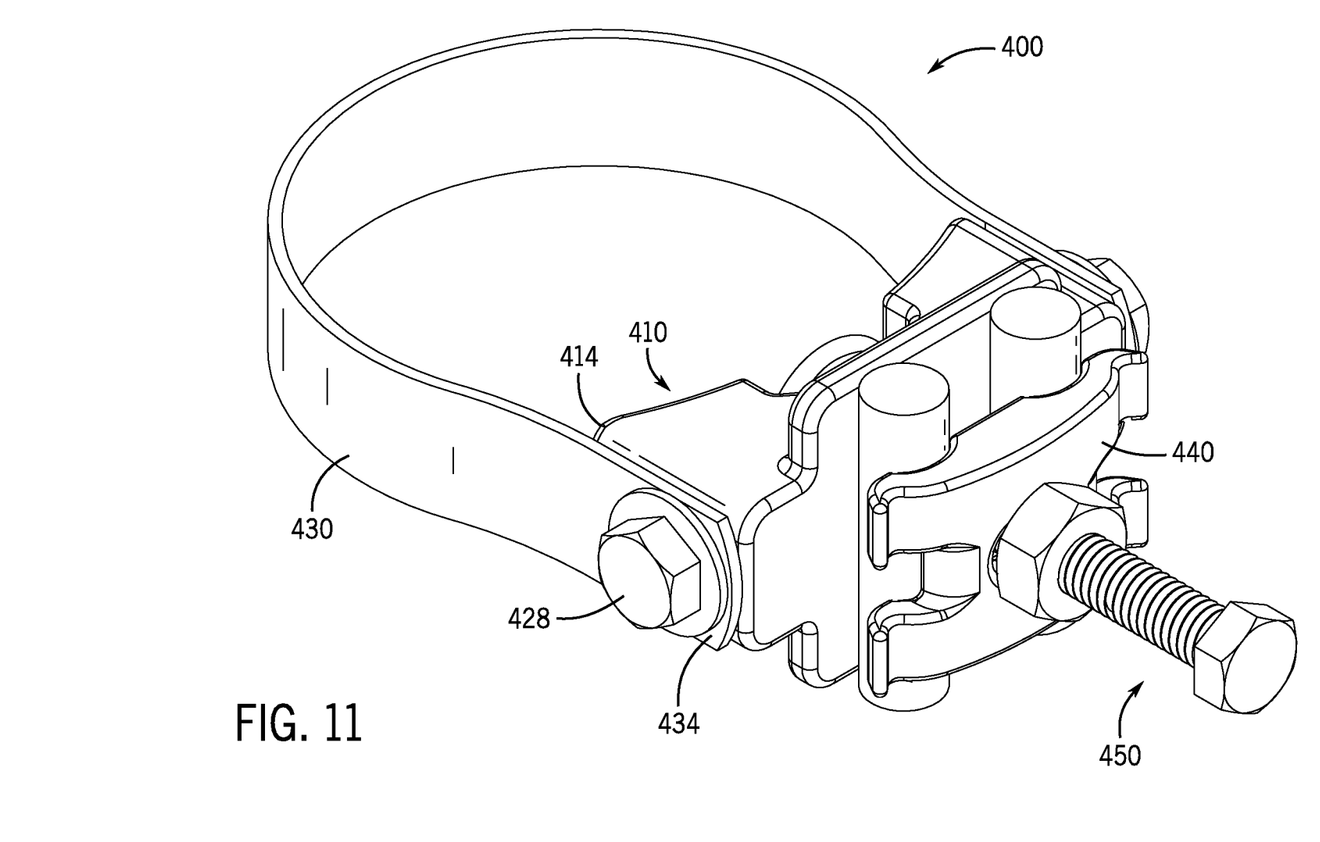
FIG. 11 is a top front isometric view of a clamp according to another embodiment of the invention.

FIG. 11 illustrates another embodiment of a clamp 400 according to the invention, as also can be secured to a pole. In many aspects, the clamp 400 is similar to the clamp 100 described above and similar numbering in the 400 series is used for the clamp 400. For example, the clamp 400 has a mounting member 410, a strap 430, a clamping member 440, and a main bolt 450. The clamp 400 is also configured to be secured to a pole 10 with the strap 430 and retain electrical conductors 12, 14 between the mounting member 410 and the clamping member 440. The clamp 400 also utilizes the main bolt 450 to further tension the strap 430 and the strap 430 provides electrical continuity between the pole 10 and the mounting member 410 and therefore also between the pole 10 and the conductors 12, 14.

In some aspects, however, the clamps 100, 400 differ from each other. For example, the second side 414 of the mounting member 410 has a strap retention device comprising a bolt 428 that receivable within a threaded hole extending into the second side 414 of the mounting member 410. The free end 434 of the strap 430 has a hole through which the bolt 428 extends to secure the free end 434 of the strap 430 to the mounting member 410. In this regard, some straps may include multiple holes to receive a bolt or other fastener, or one or more elongate holes for, adjustable securement, In other embodiments, other configurations are possible. For example, certain features and combinations of features that are presented with respect to particular embodiments in discussion above, can be utilized in other embodiments and in other combinations, as appropriate. In this regard, for example, different configurations of engagement features, attachment mechanisms, and so on, as presented with respect to a particular one of the clamps 100, 200, 300, 400 can be implemented in combination with features of any number of the other clamps 100, 200, 300, 400, or others.

Thus, embodiments of the inventions can provide an improved clamp for securing objects (e.g., electrical conductors) to a pipe, a pole, or other structure. In some embodiments, clamps according to the invention can substantially reduce the time and labor that may be required during installation and use, such as by obviating the need to hold the clamp with one hand and operate a tool with the other to secure the electrical conductors to the clamp and secure the clamp to the pole. Further, some embodiments of the invention can be adjusted to accommodate poles of different diameters. Additionally, some embodiments of the invention can be provide an electrical continuity path between a pole and an electrical conductor through a securement strap and a mounting member to which the strap and the electrical conductor are secured.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A clamp for supporting an electrical conductor on a structure and providing electrical continuity between the electrical conductor and the structure, the clamp comprising:
    a mounting member including a pocket, a threaded through-hole, and a contact surface;
    a strap coupled on one end to a first side of the mounting member and having a free end removably coupled to a second side of the mounting member, the strap configured to extend around the structure;
    a clamping member with an oblong through-hole, a curved surface, and a first conductor area;
    a main bolt extending through the through-holes of the mounting member and the clamping member, the main bolt having a footer configured to contact the structure, the footer movable between a first configuration in which the footer is nested within the pocket and a second configuration in which at least a portion of the footer is positioned outside of the pocket; and
    a nut threadably engaged with the main bolt;
    the main bolt configured to tighten the strap by moving the footer from the first configuration to the second configuration in which the footer contacts with the structure;
    the clamp configured to retain the electrical conductor between the contact surface and the first conductor area with the nut contacting the curved surface of the clamping member to clamp the electrical conductor between the clamping member and the mounting member.

2. The clamp of claim 1, wherein the second side of the mounting member includes a retention device, the retention device having a guide and a bolt extending into the guide, the guide configured to receive the free end of the strap therethrough and the bolt configured to secure the strap relative to the guide.

3. The clamp of claim 2, wherein the retention device further includes a retainer clip, the retainer clip received within the guide and configured to be positioned between the strap and the bolt so that the bolt applies force to the retainer clip over a first surface area and the retainer clip distributes the force to the strap over a second surface area larger than the first surface area.

4. The clamp of claim 1, wherein a cam member is coupled to the second side of the mounting member, the cam member configured to releasably retain the free end of the strap.

5. The clamp of claim 1, wherein the mounting member has a first surface with a complementary shape relative to a surface of the structure, the first surface configured to engage the surface of the structure when the strap is initially secured around the structure.

6. The clamp of claim 5, wherein the mounting member is configured to disengage from the surface of the structure as the main bolt urges the footer against the surface of the structure and increases tension on the strap, to be spaced apart from the surface of the structure in an installed configuration.

7. The clamp of claim 1, wherein the first conductor area of the clamping member is partially defined by protrusions extending in a direction opposite the curved surface.

8. The clamp of claim 7, wherein the clamping member further includes a second conductor area adjacent the first conductor area, wherein the first and second conductor areas are each configured to receive a respective electrical conductor therein, with the electrical conductors in parallel with each other and separated by the protrusions.

9. The clamp of claim 8, wherein the oblong through-hole is configured to allow the clamping member to swivel relative to the main bolt to engage electrical conductors of different sizes within either of the first or second conductor areas; and
    wherein the curved surface of the clamping member is configured to extend locally perpendicularly to the bolt, adjacent to the nut, with the clamping member at any of a plurality of swiveled orientations relative to the main bolt to provide a contact surface for the nut.

10. The clamp of claim 1, wherein the clamping member includes one or more flared ends that at least partially define the first conductor area.

11. The clamp of claim 10, wherein the one or more flared ends include a first flared end and a second flared end, the first and second flared ends being separated by a gap that extends through the clamping member from the curved surface to the first conductor area.

12. The clamp of claim 1, wherein the mounting member includes a first surface configured to seat against the structure when the strap extends around the structure and the footer is in the first configuration;
    wherein the strap is configured to extend around the structure with the structure extending in a first direction past the mounting member; and
    wherein the contact surface of the mounting member extends a longer distance than the first surface, in the first direction.

13. A clamp for engaging a structure in an initial securement position and a final securement position, the clamp comprising:
    a mounting member with, a first side, a second side, an internally threaded through-hole, a retention device on the second side with a guide, and a bolt extending into the guide;
    a strap coupled on one end to the first side of the mounting member and having a free end removably coupled to the second side of the mounting member, the strap configured to extend around the structure; and
    a main bolt extending through and threadably engaged with the through-hole of the mounting member, the main bolt having a footer configured to contact the structure;

the guide configured to receive the free end of the strap therethrough and the bolt configured to secure the strap to the guide;

with the clamp in the initial securement position, at least the strap and the mounting member being configured to be in contact with the structure; and with the clamp in the final securement position, at least the strap and the footer, but not the mounting member, being configured to be in contact with the structure.

14. The clamp of claim 13, wherein the retention device further includes a retainer clip, the retainer clip received within the guide and configured to be positioned between the strap and the bolt so that the bolt engages the strap via the retainer clip.

15. The clamp of claim 13, wherein, during a transition between the initial securement position and the final securement position, engagement of the footer with the structure is configured to move the mounting member away from the structure and increase tension within the strap.

16. The clamp of claim 13, wherein the clamp is configured to support and couple an electrical conductor to the structure, the clamp further comprising:

a clamping member adjacent the mounting member, the clamping member having a through-hole through which the main bolt extends; and a nut threadedly engaged on the main bolt adjacent the clamping member;

wherein the mounting member and the clamping member are configured to receive the electrical conductor therebetween and the nut abuts and is configured to be tightened against the clamping member to urge the clamping member towards the mounting member to secure the electrical conductor between the mounting member and the clamping member.

17. The clamp of claim 16, wherein the clamping member defines a first conductor area on a first side thereof and a second conductor area on a second side thereof;

wherein the clamping member includes a convex surface configured to engage the nut with the clamping member at different swiveled orientations relative to the main bolt; and wherein the through-hole of the clamping member intersects the convex surface and is oblong in a direction that extends from the first side of the clamping member toward the second side of the clamping member.

18. A method of securing a clamp in electrical continuity with a structure, the method comprising:

extending a strap around the structure, with a first end of the strap secured to a first side of a mounting member;

securing a second end of the strap to a second side of the mounting member, with a first surface of the mounting member facing the structure;

tightening a bolt that extends through the mounting member and includes a footer, so that that the footer is urged into engagement with the structure and the bolt thereby urges the mounting member away from the structure and tensions the strap; and tightening a nut on the bolt to clamp an electrical conductor to the mounting member, between a clamping member and the mounting member, to provide electrical continuity between the electrical conductor and the structure via the mounting member and one or more of the strap or the bolt.

19. The method of claim 18, wherein the electrical conductor is a first conductor;

wherein the method further comprises:

by tightening the nut, securing a second conductor to the mounting member, between the clamping member and the mounting member, the second conductor having a different diameter than the first conductor and the clamping member swiveling relative to the bolt to simultaneously secure the first and the second conductors.

20. A clamp for engaging a structure in an initial securement position and a final securement position, the clamp comprising:

a mounting member with, a first side, a second side, and an internally threaded through-hole;

a strap coupled on one end to the first side of the mounting member and having a free end removably coupled to the second side of the mounting member, the strap configured to extend around the structure; and a main bolt extending through and threadably engaged with the through-hole of the mounting member, the main bolt having a footer configured to contact the structure;

a clamping member adjacent the mounting member, the clamping member having a through-hole through which the main bolt extends; and a nut threadedly engaged on the main bolt adjacent the clamping member;

with the clamp in the initial securement position, at least the strap and the mounting member being configured to be in contact with the structure;

with the clamp in the final securement position, at least the strap and the footer, but not the mounting member, being configured to be in contact with the structure;

wherein the mounting member and the clamping member are configured to receive an electrical conductor therebetween; and wherein the nut abuts the clamping member and is configured to be tightened against the clamping member to urge the clamping member towards the mounting member to secure the electrical conductor between the mounting member and the clamping member.

* * * * *